(12) United States Patent
Li et al.

(10) Patent No.: US 11,491,836 B2
(45) Date of Patent: Nov. 8, 2022

(54) SUSPENSION DEVICE AND ALL-TERRAIN VEHICLE

(71) Applicant: SEGWAY TECHNOLOGY CO., LTD., Jiangsu (CN)

(72) Inventors: Xiang Li, Jiangsu (CN); Mingtang Chen, Jiangsu (CN)

(73) Assignee: Segway Technology Co., Ltd., Jiangsu (CN)

(*) Notice: Subject to any disclaimer, the term of this patent is extended or adjusted under 35 U.S.C. 154(b) by 0 days.

(21) Appl. No.: 17/240,487

(22) Filed: Apr. 26, 2021

(65) Prior Publication Data
US 2021/0339591 A1    Nov. 4, 2021

(30) Foreign Application Priority Data

Apr. 30, 2020    (CN) .......................... 202020708352.3

(51) Int. Cl.
*B60G 3/18*    (2006.01)
*B60G 7/02*    (2006.01)

(52) U.S. Cl.
CPC .................. *B60G 3/18* (2013.01); *B60G 7/02* (2013.01); *B60G 2200/144* (2013.01); *B60G 2300/07* (2013.01)

(58) Field of Classification Search
CPC ............. B60G 7/02; B60G 3/18; B60G 7/001
See application file for complete search history.

(56) References Cited

U.S. PATENT DOCUMENTS 7,441,788 B2 * 10/2008 Leclair ..................... B62K 5/01
                                                    280/124.135
8,360,449 B2 *  1/2013 Polakowski ............. B60G 7/02
                                                    280/86.758
(Continued)

FOREIGN PATENT DOCUMENTS

CN        111038584 A    4/2020
CN        210391299 U    4/2020
(Continued)

OTHER PUBLICATIONS

FR2712553A1 machine translation of the description from espacenet. com Jun. 2022.*

(Continued)

*Primary Examiner* — Paul N Dickson
*Assistant Examiner* — Maxwell L Meshaka
(74) *Attorney, Agent, or Firm* — Timothy W. Menasco, Esq.; Harter Secrest & Emery LLP

(57) ABSTRACT

A suspension device and an all-terrain vehicle are provided. The suspension device includes: a first rocker arm having a first end provided with a first position limiting portion; a second rocker arm spaced apart from the first rocker arm; and a steering knuckle arranged between the first end of the first rocker arm and the second rocker arm. The steering knuckle is connected with the first end of the first rocker arm and a first end of the second rocker arm, and the steering knuckle includes a third position limiting portion configured to be fitted with the first position limiting portion. The third position limiting portion is configured to abut against the first position limiting portion when the steering knuckle is moved to a first extreme height position and the all-terrain vehicle has a first maximum steering angle.

18 Claims, 6 Drawing Sheets

(56) References Cited

U.S. PATENT DOCUMENTS

| | | | | |
|---|---|---|---|---|
| 10,821,794 B2 * | 11/2020 | Nakashima | ............... | B60G 3/20 |
| 2019/0248405 A1 * | 8/2019 | Bennett | ................ | B62D 21/183 |

FOREIGN PATENT DOCUMENTS

| | | | |
|---|---|---|---|
| DE | 1455639 A1 | 5/1969 | |
| FR | 2712553 A1 | 5/1995 | |

OTHER PUBLICATIONS

FR2712553A1 machine translation of the claims from espacenet.com Jun. 2022.*
European Patent Office, Search Report for EP application 21170622.1, dated Sep. 29, 2021.

* cited by examiner

SUSPENSION DEVICE AND ALL-TERRAIN VEHICLE

CROSS-REFERENCE TO RELATED APPLICATION

This Application claims the benefit of priority to Chinese patent Application No. 202020708352.3, filed on Apr. 30, 2020, the content of which is incorporated herein by reference in its entirety.

FIELD

The present disclosure relates to a suspension device and an all-terrain vehicle.

BACKGROUND

An all-terrain vehicle is also referred to as an off-road vehicle, and the all-terrain vehicle has a quite complex traveling environment. For example, when a road surface is rugged, a wheel ascends or descends along with the road surface, and this state is maintained continuously. When the road surface is quite rugged, the wheel may have a relatively large ascending height, and then a relatively large descending distance. If a user just rotates a steering wheel by a maximum angle when the wheel ascends to a maximum height or descends to a lowest position, a ball-pin joint tends to be damaged, or an intermediate shaft of a drive half shaft falls off from inner and outer constant velocity joints, thus resulting in a driving hazard.

SUMMARY

Embodiments of the present disclosure are desired to provide a suspension device and an all-terrain vehicle.

Embodiments of a first aspect of the present disclosure provide a suspension device for an all-terrain vehicle, including: a first rocker arm having a first end provided with a first position limiting portion; a second rocker arm spaced apart from the first rocker arm; and a steering knuckle arranged between the first end of the first rocker arm and the second rocker arm, the steering knuckle being connected with the first end of the first rocker arm and a first end of the second rocker arm, and the steering knuckle including a third position limiting portion configured to be fitted with the first position limiting portion. The third position limiting portion is configured to abut against the first position limiting portion when the steering knuckle is moved to a first extreme height position and the all-terrain vehicle has a first maximum steering angle.

Embodiments of a second aspect of the present disclosure further provide an all-terrain vehicle, including a suspension device and a frame. The suspension device includes: a first rocker arm having a first end provided with a first position limiting portion; a second rocker arm spaced apart from the first rocker arm; and a steering knuckle arranged between the first end of the first rocker arm and the second rocker arm, the steering knuckle being connected with the first end of the first rocker arm and a first end of the second rocker arm, and the steering knuckle including a third position limiting portion configured to be fitted with the first position limiting portion. The third position limiting portion is configured to abut against the first position limiting portion when the steering knuckle is moved to a first extreme height position and the all-terrain vehicle has a first maximum steering angle. Second ends of the first rocker arm and the second rocker arm are both connected with the frame.

Embodiments of a third aspect of the present disclosure provide an all-terrain vehicle, including: a suspension device, a wheel, a steering wheel or a handle, and a frame. The suspension device includes: a first rocker arm having a first end provided with a first position limiting portion; a second rocker arm spaced apart from the first rocker arm; and a steering knuckle arranged between the first end of the first rocker arm and the second rocker arm, the steering knuckle being connected with the first end of the first rocker arm and a first end of the second rocker arm, and the steering knuckle including a third position limiting portion configured to be fitted with the first position limiting portion. The wheel is arranged to the steering knuckle. Second ends of the first rocker arm and the second rocker arm are both connected with the frame. The third position limiting portion is configured to abut against the first position limiting portion when the wheel is moved to a first extreme height position and the steering wheel or the handle has a first maximum steering angle.

It is to be understood that both the foregoing general description and the following detailed description are illustrative and explanatory only and are not restrictive of the present disclosure, as claimed.

DETAILED DESCRIPTION

Figure 1:
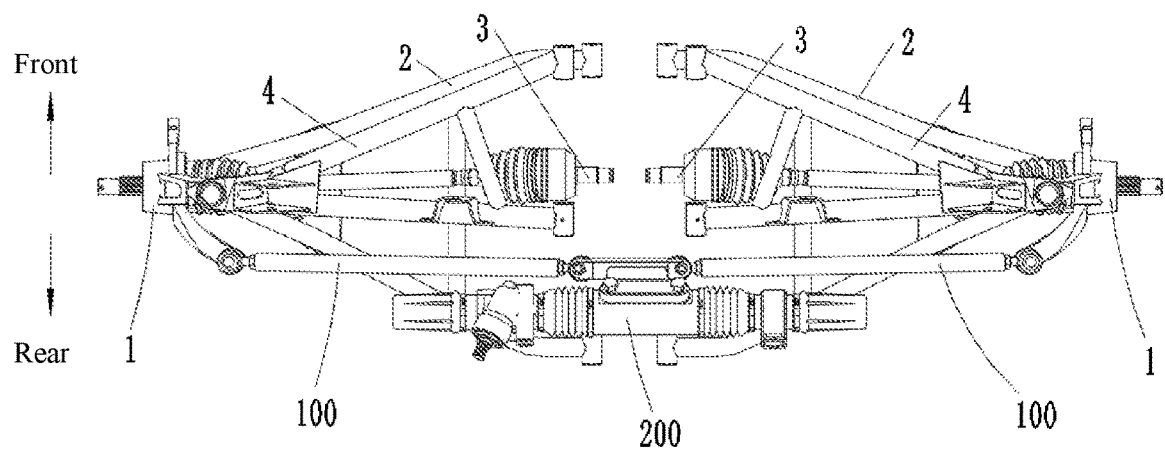
FIG. 1 is a schematic view illustrating a suspension system according to an embodiment of the present disclosure.

The present disclosure will be described in further detail with reference to the following drawings and specific embodiments. It should be understood that the specific embodiments described herein are merely for explaining the present disclosure and are not intended to limit the present disclosure.

In the description of the embodiments of the present disclosure, it should be noted that unless stated or limited otherwise, the term "connection" should be interpreted broadly, and may be, for example, electrical connections; may also be communication of two elements; may be direct connections or indirect connections via intervening structures. To those skilled in the art, the specific meaning of the above term may be understood in the specific circumstances.

It should be noted that the terms "first\second\third" involved in the embodiments of the present disclosure are only intended to distinguish between similar objects but do not indicate a specific order of the objects. It may be understood that the order or sequence of "first\second\third" may be interchanged under permitted circumstances. It should be understood that the objects distinguished by "first\second\third" are interchangeable in proper circumstances, such that the embodiments of the present disclosure described herein can be implemented in orders except the order illustrated or described herein.

It should be noted that the embodiments and features of the embodiments in the present disclosure may be combined with each other without conflict. A suspension device according to embodiments of the present disclosure will be described in detail below with reference to FIGS. 1 to 7.

The suspension device includes: a first rocker arm 4 having a first end provided with a first position limiting portion 41; a second rocker arm 2 spaced apart from the first rocker arm 4; and a steering knuckle 1 arranged between the first end of the first rocker arm 4 and the second rocker arm 2. The steering knuckle 1 is connected with the first end of the first rocker arm 4 and a first end of the second rocker arm 2, and the steering knuckle 1 has a third position limiting portion 11 configured to be fitted with the first position limiting portion 41. When the steering knuckle 1 is moved to a first extreme height position and a vehicle has a first maximum steering angle (i.e., a steering wheel or a handle of the vehicle is rotated by the first maximum steering angle), the third position limiting portion 11 abuts against the first position limiting portion 41. With the third position limiting portion 11 abutting against the first position limiting portion 41, the steering knuckle 1 may stop rotating when rotating by the first maximum steering angle, so as to prevent the steering knuckle 1 from continuously rotating beyond a safe range, thus improving safety of the suspension device.

In the embodiments of the present disclosure, the first extreme height position may be a highest or lowest bounce position of a wheel. Further, the wheel is arranged to the steering knuckle 1. When the first rocker arm 4 serves as an upper rocker arm, that is, the first position limiting portion 41 is arranged at the upper rocker arm, the first extreme height position is the lowest bounce position, i.e. when the wheel is moved to the lowest bounce position, the steering knuckle 1 is moved to the first extreme height position, and conversely, when the first rocker arm 4 serves as a lower rocker arm, that is, the first position limiting portion 41 is arranged at the lower rocker arm, the first extreme height position is the highest bounce position i.e. when the wheel is moved to the highest bounce position, the steering knuckle 1 is moved to the first extreme height position.

In the embodiment of the present disclosure, the first maximum steering angle is a maximum steering angle by which the steering wheel or the handle can be rotated when the steering knuckle is moved to the first extreme height position, because the first position limiting portion 41 will abut against the third position limiting portion 11 such that the steering wheel or the handle cannot continue to be rotated, when the steering knuckle is moved to the first extreme height position and the steering wheel or the handle is rotated by this steering angle. That is, the first maximum steering angle is a steering angle of the steering wheel or the handle at which the first position limiting portion 41 can abut against the third position limiting portion 11 when the steering knuckle 1 is moved to the first extreme height position. When the steering knuckle 1 is not moved to the first extreme height position, the steering angle of the steering knuckle 1 may exceed the first maximum steering angle, and the third position limiting portion 11 does not abut against the first position limiting portion 41.

Figure 2:
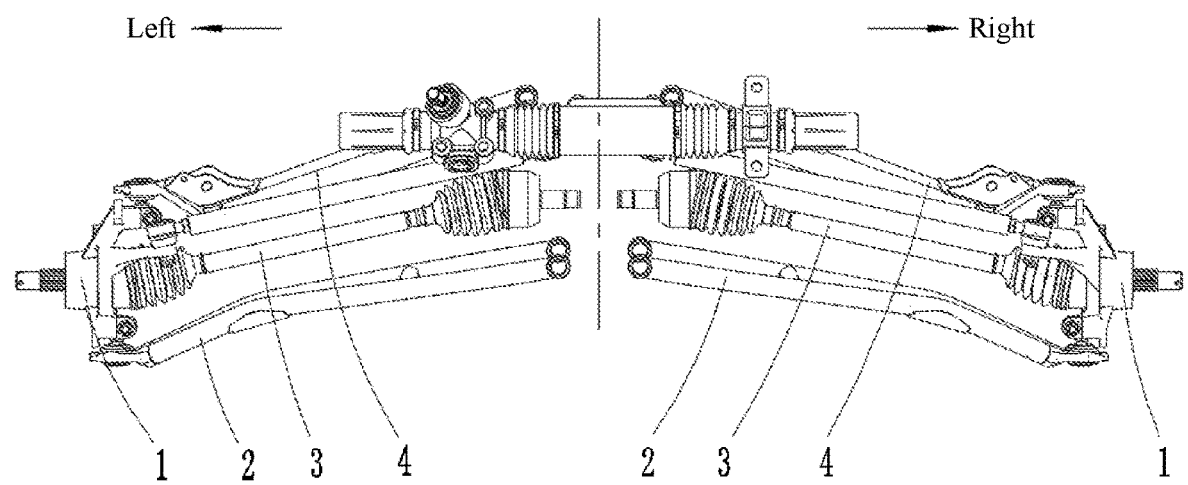
FIG. 2 is a schematic view illustrating a suspension system according to an embodiment of the present disclosure from another perspective.

In the embodiment of the present disclosure, the structure of the first rocker arm 4 is not limited. For example, as illustrated in FIGS. 1 and 2, the first rocker arm 4 may be formed by connecting a plurality of tubular structures.

In the embodiments of the present disclosure, the first end of the first rocker arm 4 has the first position limiting portion 41, while a structure of the first position limiting portion 41 is not limited. For example, the first position limiting portion 41 may be configured as a first protrusion structure.

In the embodiment of the present disclosure, the structure of the second rocker arm 2 is not limited. For example, as illustrated in FIGS. 1 and 2, the second rocker arm 2 may be formed by connecting a plurality of tubular structures.

In the embodiment of the present disclosure, the structure of the steering knuckle 1 is not limited as long as the steering knuckle 1 has the third position limiting portion 11.

In the embodiments of the present disclosure, the structure of the third position limiting portion 11 is not limited. For example, the third position limiting portion 11 may be configured as a third protrusion structure.

In the embodiments of the present disclosure, the steering knuckle 1 may form a ball joint with the first end of the first rocker arm 4. For example, a first mounting base 42 is arranged at the first end of the first rocker arm 4, and connected with the steering knuckle 1 by a first ball-pin joint 101. In the embodiments of the present disclosure, the first position limiting portion 41 may be arranged at the first mounting base 42.

In the embodiments of the present disclosure, the steering knuckle 1 may be configured as a left or right steering knuckle of the vehicle, as illustrated in FIGS. 1 and 2. It should be noted that the left and right are described herein with reference to a vehicle traveling direction.

Figure 3:
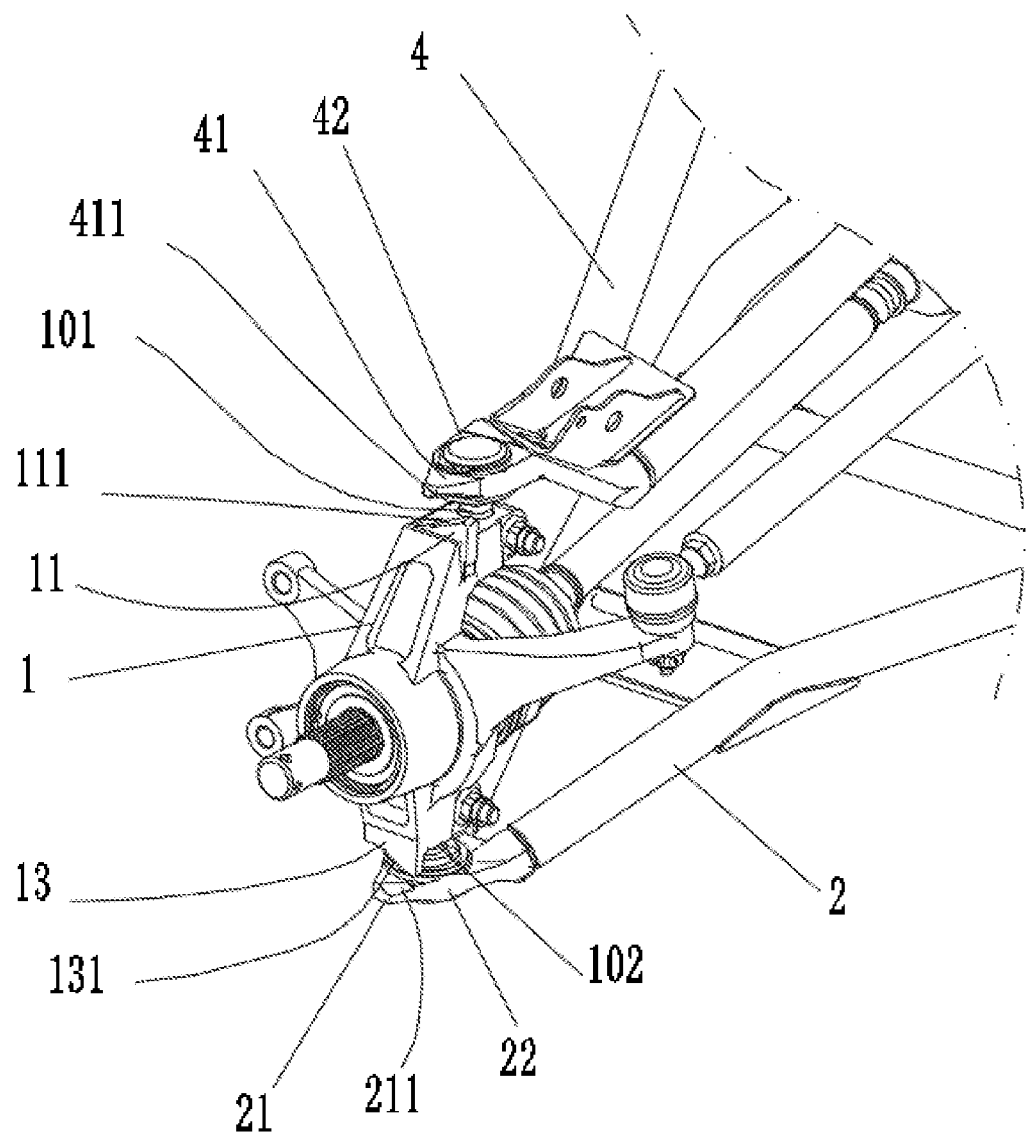
FIG. 3 is a partial schematic view of a suspension system according to an embodiment of the present disclosure.
Figure 5:
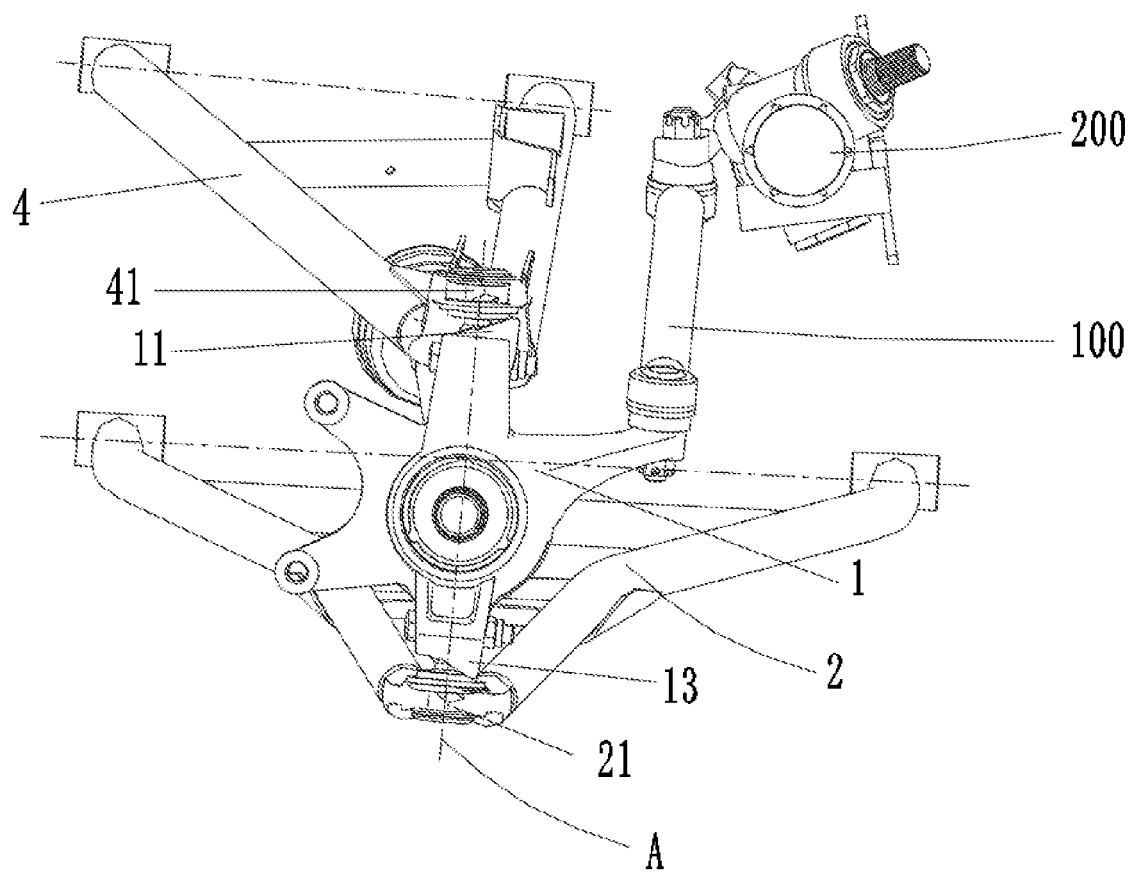
FIG. 5 is a schematic view illustrating a suspension system according to an embodiment of the present disclosure from still another perspective.

In some embodiments of the present disclosure, as illustrated in FIGS. 3 and 5, the first end of the second rocker arm 2 has a second position limiting portion 21, and the steering knuckle 1 has a fourth position limiting portion 13 configured to be fitted with the second position limiting portion 21. When the steering knuckle 1 is moved to a second extreme height position and the vehicle has a second maximum steering angle (i.e., the steering wheel or the handle of the vehicle is rotated by the second maximum steering angle), the fourth position limiting portion 13 abuts against the second position limiting portion 21. With the fourth position limiting portion 13 abutting against the second position limiting portion 21, the steering knuckle 1 may stop rotating when rotating by the second maximum steering angle, so as to prevent the steering knuckle 1 from continuously rotating beyond a safe range, thus improving the safety of the suspension device.

In the embodiments of the present disclosure, the second maximum steering angle is a maximum steering angle by which the steering wheel or the handle can be rotated when the steering knuckle is moved to the second extreme height position, because the second position limiting portion 21 will abut against the fourth position limiting portion 13 such that the steering wheel or the handle cannot continue to be rotated, when the steering knuckle is moved to the second extreme height position and the steering wheel or the handle is rotated by this steering angle. That is, the second maximum steering angle is a steering angle of the steering wheel or the handle at which the second position limiting portion 21 can abut against the fourth position limiting portion 13 when the steering knuckle 1 is moved to the second extreme height position. When not moved to the second extreme height position, the steering knuckle 1 may be rotated by an angle exceeding the second maximum steering angle, and the fourth position limiting portion 13 does not abut against the second position limiting portion 21.

In the embodiments of the present disclosure, the second extreme height position may be a highest or lowest position. Further, the wheel is arranged to the steering knuckle 1. When the second rocker arm 2 serves as the upper rocker arm, that is, the second position limiting portion 21 is arranged at the upper rocker arm, the second extreme height position is the lowest bounce position, i.e. when the wheel is moved to the lowest bounce position, the steering knuckle 1 is moved to the second extreme height position, and conversely, when the second rocker arm 2 serves as the lower rocker arm, that is, the second position limiting portion 21 is arranged at the lower rocker arm, the second extreme height position is the highest bounce position i.e. when the wheel is moved to the highest bounce position, the steering knuckle 1 is moved to the second extreme height position.

In the embodiments of the present disclosure, the first rocker arm 4 serves as the upper rocker arm, and the second rocker arm 2 serves as the lower rocker arm; the steering knuckle 1 has an upper end connected with the first end of the first rocker arm 4, and a lower end connected with the first end of the second rocker arm 2; and the first extreme height position is the lowest bounce position of the wheel, and the second extreme height position is the highest bounce position of the wheel, that is, the first extreme height position is lower than the second extreme height position.

Figure 6:
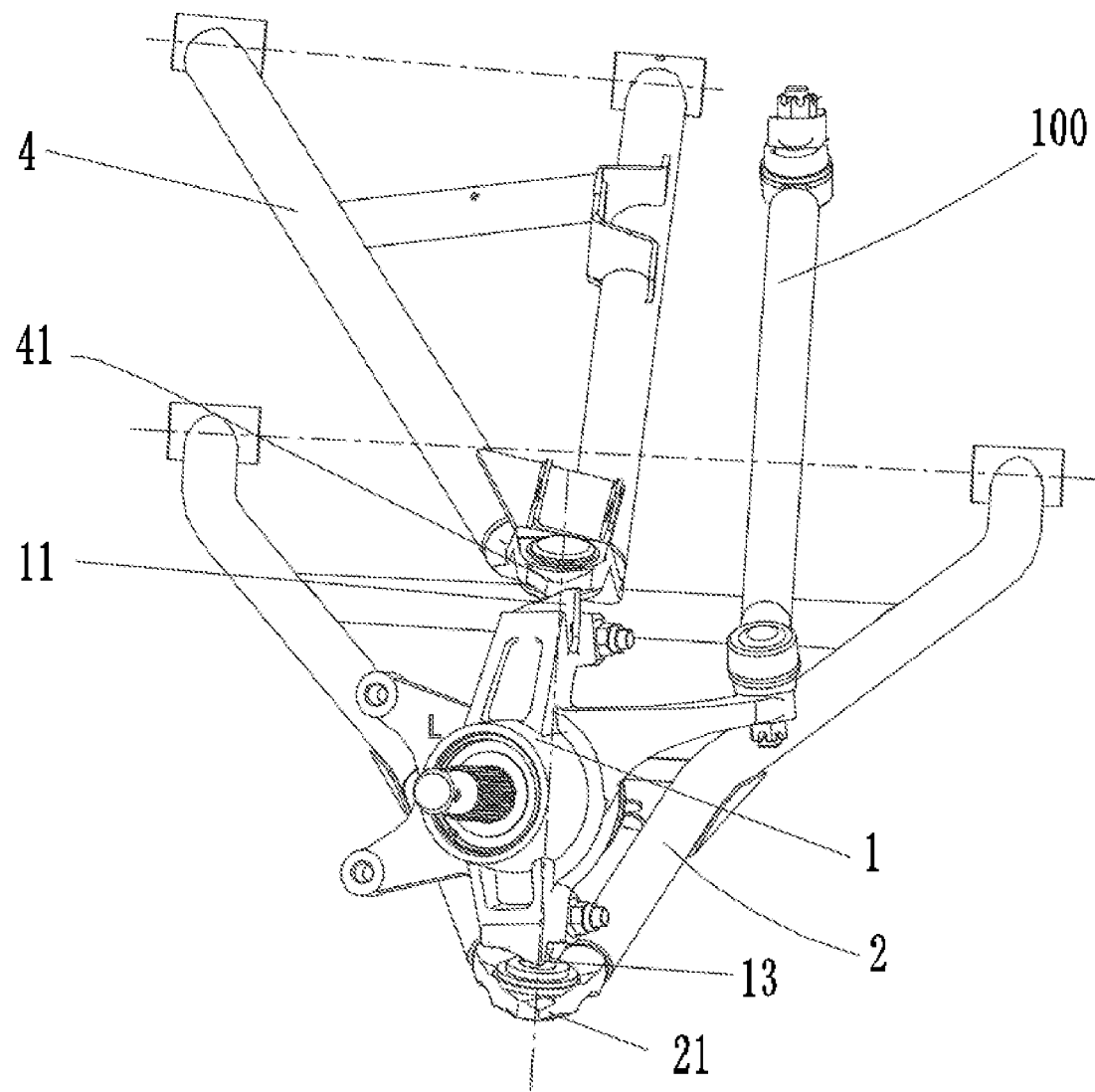
FIG. 6 is a schematic view illustrating a suspension system according to an embodiment of the present disclosure, in which a first position limiting portion abuts against a third position limiting portion.
Figure 7:
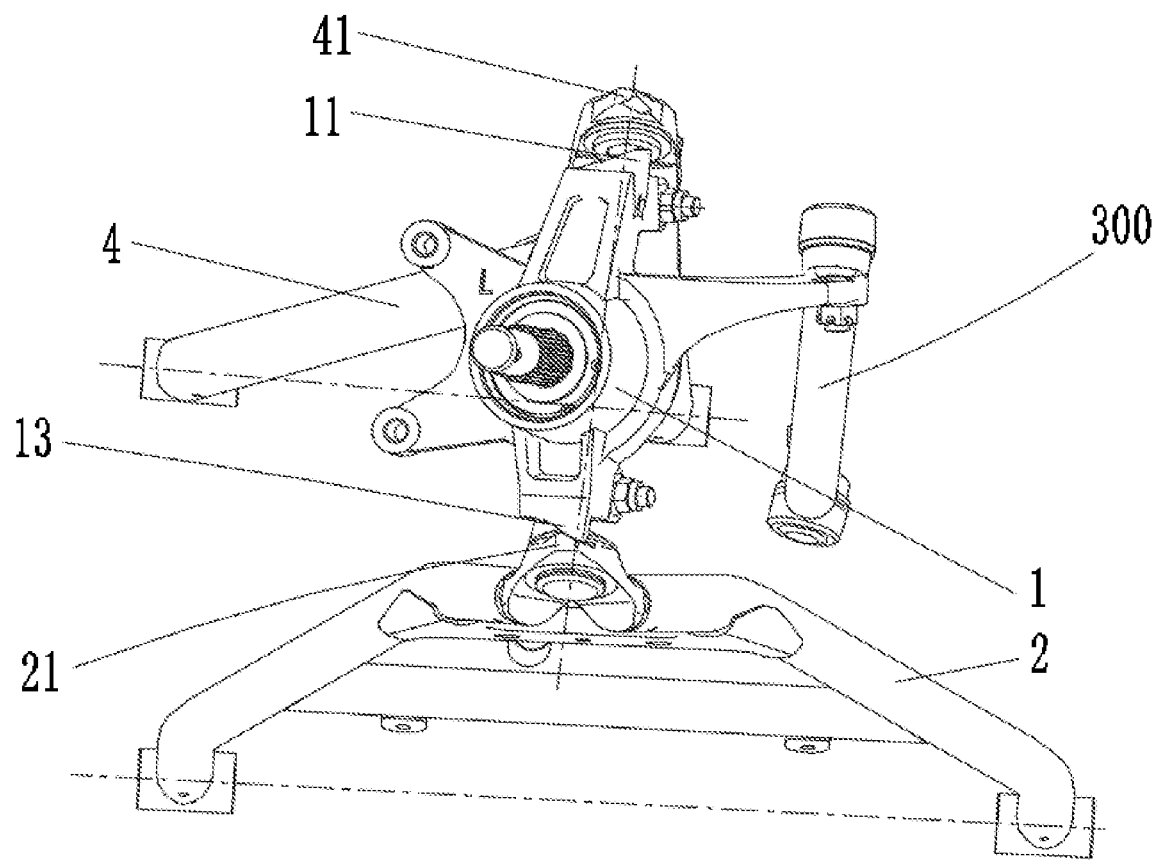
FIG. 7 is a schematic view illustrating a suspension system according to an embodiment of the present disclosure, in which a second position limiting portion abuts against a fourth position limiting portion.

When the suspension device serves as a left suspension device, the wheel of the vehicle bounces on a rugged road surface in the traveling process. When the wheel of the vehicle bounces to the highest position (i.e., the second extreme height position), and the steering wheel is turned to the right or the handle is turned to rotate the steering knuckle 1 by the second maximum steering angle, the second position limiting portion 21 abuts against the fourth position limiting portion 13, as illustrated in FIG. 7, and the steering knuckle 1 is unable to continue rotating at this point, thus protecting each ball-pin joint. When the vehicle bounces to the lowest position (i.e., the first extreme height position), and the steering wheel is turned to the right or the handle is turned to rotate the steering knuckle 1 by the first maximum steering angle, the first position limiting portion 41 abuts against the third position limiting portion 11, as illustrated in FIG. 6, and the steering knuckle 1 is unable to continue rotating at this point, thus protecting each ball-pin joint.

When the suspension device serves as a right suspension device, the wheel of the vehicle bounces on the rugged road surface in the traveling process. When the wheel of the vehicle bounces to the highest position (i.e., the second extreme height position), and the steering wheel is turned to the left or the handle is turned to rotate the steering knuckle 1 by the second maximum steering angle, the second position limiting portion 21 abuts against the fourth position limiting portion 13, and the steering knuckle 1 is unable to continue rotating at this point, thus protecting each ball-pin joint; and when the vehicle bounces to the lowest position (i.e., the first extreme height position), and the steering wheel is turned to the left or the handle is turned to rotate the steering knuckle 1 by the first maximum steering angle, the first position limiting portion 41 abuts against the third position limiting portion 11, and the steering knuckle 1 is unable to continue rotating at this point, thus protecting each ball-pin joint.

Certainly, the left and right suspension devices may both adopt the suspension device according to the embodiments of the present disclosure, that is, the position limitation may be performed for left and right turns, thus protecting each ball-pin joint of the left and right suspension devices.

In the embodiments of the present disclosure, the first and second maximum steering angles may have the same or different values.

In the embodiments of the present disclosure, the structure of the second position limiting portion 21 is not limited. For example, the second position limiting portion 21 may be configured as a second protrusion structure. The structure of the fourth position limiting portion 13 is not limited. For example, the fourth position limiting portion 13 may be configured as a fourth protrusion structure.

In the embodiments of the present disclosure, the third position limiting portion 11 may be arranged at the upper end of the steering knuckle 1, and the fourth position limiting portion 13 may be arranged at the lower end of the steering knuckle 1.

Figure 4:
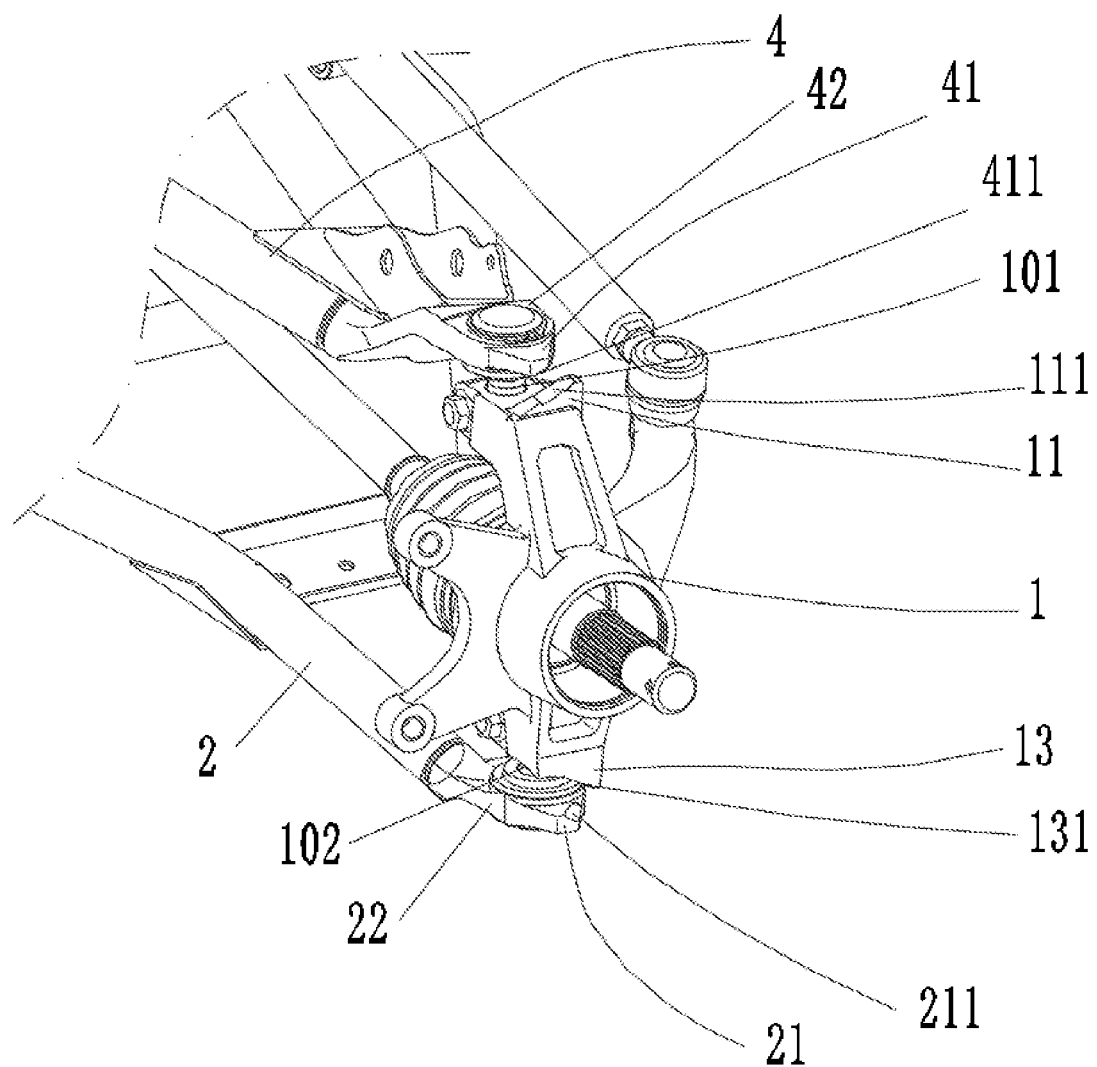
FIG. 4 is a partial schematic view of a suspension system according to an embodiment of the present disclosure from another perspective.

In the embodiments of the present disclosure, as illustrated in FIGS. 3 and 4, the first position limiting portion 41 may be configured as a first boss which has a first inclined surface 411, the third position limiting portion 11 may be configured as a third boss extending upwards from the upper end of the steering knuckle 1, the third boss may have a third inclined surface 111, and when the steering knuckle 1 is moved to the first extreme height position, the first inclined surface 411 abuts against the third inclined surface 111. Certainly, the first boss may also come into a point or line contact with the third boss.

In the embodiments of the present disclosure, as illustrated in FIGS. 3 and 4, the second position limiting portion 21 may be configured as a second boss which has a second inclined surface 211, the fourth position limiting portion 13 may be configured as a fourth boss extending downwards from the lower end of the steering knuckle 1, the fourth boss may have a fourth inclined surface 131, and when the steering knuckle 1 is moved to the second extreme height position, the second inclined surface 211 abuts against the fourth inclined surface 131. Certainly, the second boss may also come into a point or line contact with the fourth boss.

It should be noted that the upper and lower are described herein with reference to the ground.

In the embodiments of the present disclosure, the first and second inclined surfaces 411, 211 may both extend from front to rear, and the third and fourth inclined surfaces 111, 131 may both extend in a left-right direction. It should be noted that the front and rear as well as the left and right are described herein with reference to the vehicle traveling direction.

In the embodiments of the present disclosure, the steering knuckle 1 may form a ball joint with the first end of the first rocker arm 2. For example, a second mounting base 22 is arranged at the first end of the second rocker arm 2, and connected with the steering knuckle 1 by a second ball-pin joint 102. In the embodiments of the present disclosure, the second position limiting portion 21 may be arranged at the second mounting base 22.

In the embodiments of the present disclosure, the first and second position limiting portions 41, 21 may both pass through a first plane, and the first plane is perpendicular to the vehicle traveling direction, and passes through a connecting line A formed by centers of the first and second mounting bases 42, 22. Certainly, the first and second position limiting portions 41, 21 may also be arranged at other positions.

In the embodiments of the present disclosure, the third and fourth position limiting portions 11, 13 may both pass through the first plane when the vehicle does not turn.

In the embodiments of the present disclosure, the third and fourth position limiting portions 11, 13 have equal distances from a center of the steering knuckle 1. Certainly, the third and fourth position limiting portions 11, 13 may also have unequal distances from the center of the steering knuckle 1.

The embodiments of the present disclosure further provide an all-terrain vehicle, including the suspension device according to the embodiment of the present disclosure and a frame. The second ends of the first and second rocker arms 4, 2 are both connected with the frame.

In some embodiments of the embodiment of the present disclosure, the all-terrain vehicle may further include: a wheel arranged at the steering knuckle and a constant-velocity drive half shaft 3 forming ball joints with the frame and the steering knuckle 1 respectively.

In the embodiments of the present disclosure, as illustrated in FIGS. 1 and 2, the all-terrain vehicle may further include a steering link 100 and a steering gear assembly 200, the steering link 100 forms ball joints with an end of the steering gear assembly 200 and the steering knuckle 1, respectively. When a steering operation is required, the steering wheel or the handle is rotated, then the steering gear assembly 200 drives the steering link 100 to rotate, and finally, the steering knuckle 1 is driven to rotate, so as to achieve the steering of the wheel.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A suspension device for an all-terrain vehicle, comprising:
   a first rocker arm having a first end provided with a first position limiting portion;
   a second rocker arm spaced apart from the first rocker arm; and
   a steering knuckle arranged between the first end of the first rocker arm and the second rocker arm, the steering knuckle being connected with the first end of the first rocker arm and a first end of the second rocker arm, and the steering knuckle comprises a third position limiting portion configured to be fitted with the first position limiting portion,
   wherein the third position limiting portion is configured to abut against the first position limiting portion when the steering knuckle is moved to a first extreme height position and the all-terrain vehicle has a first maximum steering angle,
   the first rocker arm serves as an upper rocker arm, and the first extreme height position is a lowest bounce position.

2. The suspension device according to claim 1, wherein the first end of the second rocker arm is provided with a second position limiting portion;
   the steering knuckle comprises a fourth position limiting portion configured to be fitted with the second position limiting portion; and
   the fourth position limiting portion is configured to abut against the second position limiting portion when the steering knuckle is moved to a second extreme height position and the all-terrain vehicle has a second maximum steering angle.

3. The suspension device according to claim 2, wherein the first maximum steering angle and the second maximum steering angle have the same or different values.

4. The suspension device according to claim 2, wherein the second rocker arm serves as a lower rocker arm;
   the steering knuckle has an upper end connected with the first end of the first rocker arm, and a lower end connected with the first end of the second rocker arm; and
   the first extreme height position is lower than the second extreme height position.

5. The suspension device according to claim 3, wherein the third position limiting portion is arranged at the upper end of the steering knuckle, and the fourth position limiting portion is arranged at the lower end of the steering knuckle.

6. The suspension device according to claim 5, wherein the first position limiting portion is configured as a first boss having a first inclined surface, the third position limiting portion is configured as a third boss extending upwards from the upper end of the steering knuckle, the third boss has a third inclined surface, and the first inclined surface is configured to abut against the third inclined surface when the steering knuckle is moved to the first extreme height position.

7. The suspension device according to claim 6, wherein the second position limiting portion is configured as a second boss having a second inclined surface, the fourth position limiting portion is configured as a fourth boss extending downwards from the lower end of the steering knuckle, the fourth boss has a fourth inclined surface, and the second inclined surface is configured to abut against the fourth inclined surface when the steering knuckle is moved to the second extreme height position.

8. The suspension device according to claim 7, wherein the first inclined surface and the second inclined surface both extend from front to rear, and the third inclined surface and the fourth inclined surface both extend in a left-right direction.

9. The suspension device according to claim 2, wherein the first end of the first rocker arm is provided with a first mounting base, and the first mounting base is connected with the steering knuckle by a first ball-pin joint; and
   the first end of the second rocker arm is provided with a second mounting base, and the second mounting base is connected with the steering knuckle by a second ball-pin joint.

10. The suspension device according to claim 9, wherein the first position limiting portion is arranged at the first mounting base, and the second position limiting portion is arranged at the second mounting base.

11. The suspension device according to claim 2, wherein the first position limiting portion and the second position limiting portion both pass through a first plane, and the first plane is perpendicular to a vehicle traveling direction, and passes through a connecting line formed by centers of the first mounting base and the second mounting base.

12. The suspension device according to claim 11, wherein the third position limiting portion and the fourth position limiting portion both pass through the first plane when the vehicle does not turn.

13. The suspension device according to claim 2, wherein the third position limiting portion and the fourth position limiting portion have equal distances from a center of the steering knuckle.

14. An all-terrain vehicle, comprising:
a suspension device, comprising:
a first rocker arm having a first end provided with a first position limiting portion;
a second rocker arm spaced apart from the first rocker arm; and
a steering knuckle arranged between the first end of the first rocker arm and the second rocker arm, the steering knuckle being connected with the first end of the first rocker arm and a first end of the second rocker arm, and the steering knuckle comprises a third position limiting portion configured to be fitted with the first position limiting portion,
wherein the third position limiting portion is configured to abut against the first position limiting portion when the steering knuckle is moved to a first extreme height position and the all-terrain vehicle has a first maximum steering angle; and
a frame, second ends of the first rocker arm and the second rocker arm being both connected with the frame,
wherein the first end of the second rocker arm is provided with a second position limiting portion;
the steering knuckle comprises a fourth position limiting portion configured to be fitted with the second position limiting portion; and
the fourth position limiting portion is configured to abut against the second position limiting portion when the steering knuckle is moved to a second extreme height position and the all-terrain vehicle has a second maximum steering angle,
wherein the first rocker arm serves as an upper rocker arm, and the second rocker arm serves as a lower rocker arm;
the steering knuckle has an upper end connected with the first end of the first rocker arm, and a lower end connected with the first end of the second rocker arm; and
the first extreme height position is lower than the second extreme height position.

15. The all-terrain vehicle according to claim 14, wherein the third position limiting portion is arranged at the upper end of the steering knuckle, and the fourth position limiting portion is arranged at the lower end of the steering knuckle.

16. The all-terrain vehicle according to claim 15, wherein the first position limiting portion is configured as a first boss having a first inclined surface, the third position limiting portion is configured as a third boss extending upwards from the upper end of the steering knuckle, the third boss has a third inclined surface, and the first inclined surface is configured to abut against the second inclined surface when the steering knuckle is moved to the first extreme height position.

17. The all-terrain vehicle according to claim 16, wherein the second position limiting portion is configured as a second boss having a second inclined surface, the fourth position limiting portion is configured as a fourth boss extending downwards from the lower end of the steering knuckle, the fourth boss has a fourth inclined surface, and the second inclined surface is configured to abut against the fourth inclined surface when the steering knuckle is moved to the second extreme height position.

18. An all-terrain vehicle, comprising:
a suspension device, comprising:
a first rocker arm having a first end provided with a first position limiting portion;
a second rocker arm spaced apart from the first rocker arm; and
a steering knuckle arranged between the first end of the first rocker arm and the second rocker arm, the steering knuckle being connected with the first end of the first rocker arm and a first end of the second rocker arm, and the steering knuckle comprises a third position limiting portion configured to be fitted with the first position limiting portion;
a wheel arranged to the steering knuckle;
a steering wheel or a handle; and
a frame, second ends of the first rocker arm and the second rocker arm being both connected with the frame,
wherein the third position limiting portion is configured to abut against the first position limiting portion when the wheel is moved to a first extreme height position and the steering wheel or the handle has a first maximum steering angle,
the first rocker arm serves as a lower rocker arm, the first extreme height position is a highest bounce position.

* * * * *